H. C. Hunt,
Head Rest.

N° 77,043. Patented Apr. 21, 1868.

Witnesses;
F. S. Colburn
C. P. Miller

Inventor,
H. C. Hunt

United States Patent Office.

H. C. HUNT, OF AMBOY, ILLINOIS.

Letters Patent No. 77,043, dated April 21, 1868; antedated April 10, 1868.

IMPROVED HEAD-REST.

*The Schedule referred to in these Letters Patent and making part of the same.*

TO ALL WHOM IT MAY CONCERN:

Be it known that I, H. C. HUNT, of Amboy, in the county of Lee, and State of Illinois, have invented certain new and useful Improvements in Passenger Head-Rests; and I hereby declare that the following is a full, clear, and exact description of the same, reference being had to the accompanying drawings which form a part of these specifications.

Figure 1:
Figure 1 is a perspective view, representing the rest while in use, when attached to a common chair.

To enable those skilled in manufacture the more clearly to understand my invention, I will proceed to describe it as follows, viz:

Fig. 1 is a perspective view, representing a man who may be waiting at a railroad-station for the cars, and has applied his head-rest to the back of a common chair, and is now enjoying the benefits of it. A is the pad or cushion, composed of a piece of wire, bent in any desirable form. The ends being brought together and embraced with a piece of brass or other material are soldered, the brass forming an eye, $r$, which receives the pivot on the ends of the fork C, there being a corresponding eye at each end of the pad A. The wire or frame-work is then covered with any suitable material to form an easy support for the head of the occupant.

Figure 2:
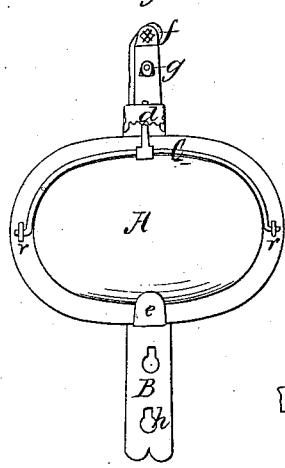
Figure 2 represents all the parts, in their most compact form, when not in use, but as carried in the pocket or elsewhere.

Fig. 2 represents the standard, B, with a series of holes, $h$, (by which it may be adjusted in height,) its stub, $g$, and end, $f$, which is bent at right angles with the standard, and has a star-shaped perforation, by which means the rest or pad may be set at any desired angle, horizontally, and held securely by means of the square on the shank of the fork C. The hooks $d$ and $e$ are attached, and the pad A, with its fork C, placed between them, with the lower extremity of the shank on the fork C passing through a hole in the hook $d$. The hook $e$ is then slipped up till it embraces the lower edge of the cushion A, and thus holds it in the position in which it is carried in the pocket or elsewhere.

Figure 3:
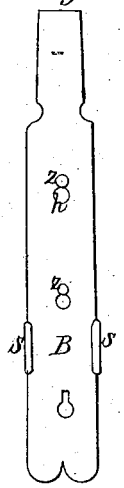
Figure 3 shows the standard, with its holes, $h$, and hooks, $e$ and $d$, attached.

Fig. 3 shows the front side of the standard B, with its holes $h$, which have a short slot extending upward from each, and the studs $z$ are passed through the holes $h$, and the shanks of the studs (being smaller than the faces of them) are slipped into the slots, and the hook $d$, to which the studs are attached, is thus securely held to the standard B. The hook $e$ is attached to the standard by means of the lips $s$, which merely embrace the edges of the standard, and may be slipped at pleasure to any desired point for attaching the rest to chair or settee-backs, and the hook $e$ may be readily removed when the rest is to be applied to a car-seat or upholstered chair, the hook $d$ holding the rest in position until the occupant leans against the standard, as shown in fig. 1.

Figure 4:
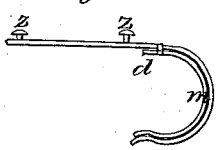
Figures 4 and 5 represent the hooks $d$ and $e$, $d$ with its studs $z$ and rubber $m$, and $e$ with its lips $s$.

Fig. 4 represents the hook $d$, with its studs $z$, and lining, $m$, which is made of rubber, or any suitable material, to prevent the hook from marring the rail on the car-seat or back of a chair or settee.

Figure 5:

Fig. 5 shows the hook $e$ attached to a section of the standard B, with the lips $s$ of the hook $e$ embracing the edges of the said section of the standard B, the whole being constructed of any suitable material, and arranged, as shown and described, so as to constitute a compact, cheap, adjustable, and self-adjusting portable pocket head-rest for passengers, invalids, or others.

The fork C inclines forward, (as will be seen in fig. 1,) for the purpose of securing a greater degree of adjustability, as the pad A may be thrown forward or backward, (by reversing the fork C,) a distance corresponding to the inclination of the fork.

Having thus described my invention, I do not claim broadly a head-rest, for such articles have long been in use, but

What I do claim as new, and desire to secure by Letters Patent, is—

The passenger or invalid head-rest, herein shown and described, composed of the pad A, perforated standard B, inclined fork C, and hooks $d$ and $e$, when constructed and arranged in the manner shown and described.

H. C. HUNT.

Witnesses:
GEORGE W. MINGLE,
ALBERT H. MERRIFIELD.